(12) United States Patent
Peterson et al.

(10) Patent No.: US 12,542,760 B2
(45) Date of Patent: Feb. 3, 2026

(54) SYSTEM AND METHOD FOR PROVIDING APPLICATION ISOLATION ON A PHYSICAL, VIRTUAL OR CONTAINERIZED NETWORK OR HOST MACHINE

(71) Applicant: Ericom Software Ltd., Jerusalem (IL)

(72) Inventors: John Peterson, Morgan Hll, CA (US); Eran Heyman, Closter, NJ (US)

(73) Assignee: ERICSSON ENTERPRISE WIRELESS SOLUTIONS ISRAEL LTD., Jerusalem (IL)

( * ) Notice: Subject to any disclaimer, the term of this patent is extended or adjusted under 35 U.S.C. 154(b) by 556 days.

(21) Appl. No.: 17/221,946

(22) Filed: Apr. 5, 2021

(65) Prior Publication Data

US 2021/0314297 A1    Oct. 7, 2021

Related U.S. Application Data

(60) Provisional application No. 63/005,365, filed on Apr. 5, 2020.

(51) Int. Cl.
*H04L 9/00* (2022.01)
*H04L 9/40* (2022.01)

(52) U.S. Cl.
CPC ........ *H04L 63/0236* (2013.01); *H04L 63/101* (2013.01); *H04L 63/1416* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2013/0298201 A1* | 11/2013 | Aravindakshan | H04L 69/164 726/4 |
| 2014/0201813 A1* | 7/2014 | Barkie | H04L 63/107 726/4 |
| 2018/0026987 A1* | 1/2018 | Jayawardena | H04L 63/0892 726/7 |
| 2020/0236112 A1* | 7/2020 | Pularikkal | H04L 63/20 |

* cited by examiner

*Primary Examiner* — Syed M Ahsan
(74) *Attorney, Agent, or Firm* — Rivka Friedman (57) ABSTRACT

A method for isolating applications on a network, the method including: denying network traffic access to applications sitting behind an Access Gateway Engine; receiving a username of a user that logs onto the network; extracting a source address associated with the username; retrieving a list of applications with which the username is permitted to communicate; extracting application destination information for each application of the list of applications; generating an access control policy for the username, the access control policy allowing the username having the source address to communicate with the list of application each of which having respective the destination information; the Access Gateway Engine allowing or denying the network traffic, originating from the username source address, access to the applications, according to the access control policy for the user.

8 Claims, 9 Drawing Sheets

```
┌─────────────────────────────────────────────────────────────────┐
│ Denying network traffic access to applications sitting behind   │
│ Access Gateway Engine                                    702    │
└─────────────────────────────────────────────────────────────────┘
                              ▼
┌─────────────────────────────────────────────────────────────────┐
│ Receiving a username of a user that logs onto the system   704  │
└─────────────────────────────────────────────────────────────────┘
                              ▼
┌─────────────────────────────────────────────────────────────────┐
│ Extracting a source address associated with the username   706  │
└─────────────────────────────────────────────────────────────────┘
                              ▼
┌─────────────────────────────────────────────────────────────────┐
│ Retrieving a list of applications with which the username is    │
│ permitted to communicate                                 708    │
└─────────────────────────────────────────────────────────────────┘
                              ▼
┌─────────────────────────────────────────────────────────────────┐
│ Extracting application destination information for each         │
│ application                                              710    │
└─────────────────────────────────────────────────────────────────┘
                              ▼
┌─────────────────────────────────────────────────────────────────┐
│ Generating an access control policy for the username      712   │
└─────────────────────────────────────────────────────────────────┘
                              ▼
┌─────────────────────────────────────────────────────────────────┐
│ Access Gateway Engine allowing or denying network traffic       │
│ according to the access control policy.                  714    │
└─────────────────────────────────────────────────────────────────┘
                              ▼
┌─────────────────────────────────────────────────────────────────┐
│ Remove Access Control Policy when user logs off           716   │
└─────────────────────────────────────────────────────────────────┘
```

SYSTEM AND METHOD FOR PROVIDING APPLICATION ISOLATION ON A PHYSICAL, VIRTUAL OR CONTAINERIZED NETWORK OR HOST MACHINE

This patent application claims priority from, and the benefit of, U.S. Provisional Patent Application No. 63/005,365, filed Apr. 3, 2020, which is incorporated in its entirety as if fully set forth herein.

FIELD OF THE INVENTION

The present invention relates to a method and system for network security and, more particularly, to a physical, virtual or containerized computer network or a host machine that provides network communication to applications, wherein network communication is provided only after authentication and authorization for the specific application has occurred, while ensuring authorized communication is not malicious.

BACKGROUND OF THE INVENTION

As organizations increase remote access to corporate computing applications due to increased work from home/remote business models and the increased need to enable offsite vendor and contractor access to such applications, traditional remote access solutions have introduced significant security risks. Furthermore, corporate computing environments have embraced BYOD (bring your own device) and more and more personal computing devices (iPhones, Android, tablets, PCs) are being brought into the corporate infrastructure that may be infected with malware that can spread laterally or breach corporate information.

Traditional solutions that enable remote access to networks that ultimately lead to remote access to applications have typically included technologies that fall into the historic, Virtual Private Network category (IPSEC, SSL VPN, L2TP, etc.). The challenge with these legacy technologies is that they have provided device to network access first vs. user to application access first. The fundamental problem with this approach is in the device to network access first model. With this model, once a user is on the network, that use can move laterally within the network to other applications that the user may or may not be authorized to communicate with. This model now puts the burden of authentication onto the applications to allow access. One might think that this approach is just fine, however history has proven that applications often have unknown vulnerabilities and by allowing even unauthenticated network communication to those applications, opens up the possibility for a malicious actor to exploit weaknesses within them. These same problems that exist with remote access also exist with local access, especially when users bring in unmanaged devices into the infrastructure.

These well-known problems have caused the cybersecurity industry to react and build solutions that promise to provide authentication & authorization first before allowing any sort of communication to said applications. This new model prevents unauthorized users from sending even a single packet to an application, that could take advantage of a vulnerability. The industry is now calling these solutions, "ZTNA" or Zero Trust Network Access, "SDP" or Software Defined Perimeter and they are beginning to show promise. The challenges with these ZTNA/SDP solutions, are that a significant amount of friction exists in the migration away from existing, legacy VPN architectures to modern day ZTNA/SDP architectures. Organizations want to achieve the benefits of ZTNA/SDP without having to replace existing or new investments in VPN solutions or undergo the burden of reconfiguring the networking environment.

SUMMARY OF THE INVENTION

According to the present invention there is provided a method for isolating applications on a network, the method including: denying network traffic access to applications sitting behind an Access Gateway Engine; receiving a username of a user that logs onto the network; extracting a source address associated with the username; retrieving a list of applications with which the username is permitted to communicate; extracting application destination information for each application of the list of applications; generating an access control policy for the username, the access control policy allowing the username having the source address to communicate with the list of application each of which having respective the destination information; the Access Gateway Engine allowing or denying the network traffic, originating from the username source address, access to the applications, according to the access control policy for the user.

According to further features in preferred embodiments of the invention described below the method further includes effecting security-related tasks on the network traffic passing through the Access Gateway Engine.

According to still further features in the described preferred embodiments the method includes detecting suspicious or malicious data packets or behavior from the network traffic; and associating the suspicious or malicious data packets or behavior with the username from which the network traffic originated. According to still further features the method further includes removing the access control policy from the access gateway engine.

According to still further features the step of removing the access control policy includes: receiving the username of the user when the user logs off the network, re-extracting the source address associated with the username, re-retrieving the list of applications with which the username is permitted to communicate, re-extracting the application destination information for each of the list of applications, regenerating the access control policy for the username, searching the access gateway engine for the access control policy, and removing the access control policy from the access gateway engine.

According to still further features the username and source address are extracted by an application programming interface (API). According to still further features the username and network address are extracted by parsing an authentication log received from a native authentication service of the network.

According to another embodiment there is provided an Application Isolation System installed on a network, the system including: an access gateway engine (AGE) interposed between a user and an application, the AGE configured to allow or deny the user network access to the application based on an access control policy; and an Access Controller in network communication with a native authentication service and a native authorization database, the Access Controller configured to generate the access control policy based on user authentication logs from the native authentication service and an authorization policy from the native authorization service, wherein the AGE provides zero trust network access controls to the network.

According to further features, the Access Controller includes: a User to Network Address Extraction & Correlation (UNA E&C) Engine configured to extract a username and associated source network address for the user; and an Authorization Engine configured to extract from the authorization policy, a list of applications and corresponding, respective destination information for each application of the list of applications.

According to still further features the UNA E&C engine polls the native authentication service. According to still further features the UNA E&C engine is configured to receive and parse the user authentication logs to extract the username and associated source network address.

According to still further features the destination information for each the application, includes at least one of: a network destination address, a destination port and a protocol type.

According to still further features the system further includes an Authentication Portal adapted to facilitate a user logon from outside the network. According to still further features the AGE includes a micro component engine configured to provide content inspection and additional security-related tasks on data packets allowed by the AGE.

BRIEF DESCRIPTION OF THE DRAWINGS

15 Various embodiments are herein described, by way of example only, with reference to the accompanying drawings, wherein.

DESCRIPTION OF THE PREFERRED EMBODIMENTS

Preferred embodiments of the invention include a method and system for providing isolation for a plurality of applications operating on a physical, virtual or containerized network or host machine. A plurality of applications is defined on said networks or host machines and are interconnected via the network infrastructure. Applications communicate across the switching infrastructure via network communication protocols such as but not limited to, UDP, TCP/IP, IPX/SPX, NetBIOS and the like. Each application will have uniqueness within the network addressing schema such as, but not limited to, a unique TCP port number, IP address or combination of the like. An example of an application could be a web server, database, IoT device, HRIS system, CRM system, SaaS applications, that a user may need to access to perform computing related tasks.

According to the instant innovation, applications are isolated from the totality of the network by placing one or more isolation gateways between users and applications and, optionally, between different applications on the same network. The purpose of isolating applications is so that the totality of the network, which includes users and other devices, are by default, unable to communicate with applications until properly authenticated and authorized. The instant method and system effectively create a "Zero Trust Dark Network", in which the behavior of the network changes from the prior default behavior of allowing communication to all, to a new behavior of denying communication to all, until properly authenticated and authorized. The user may be authenticated by any method that exists within the environment and the instant security solution will capture authentication events and perform the authorization of access to the application.

The instant system helps organizations extend the usefulness of their existing VPN solution, while, over time, design a plan and roadmap to implement SDP solutions. The instant system and method also enable a more robust level of security that provides secure communication laterally (East to West) and remotely (North to South). The aforementioned network security is achieved through the deployment of the instant system, which is referred throughout the remainder of this document as an Application Isolation System 10.

The principles and operation of an Application Isolation System according to the present invention may be better understood with reference to the drawings and the accompanying description.

Figure 1:
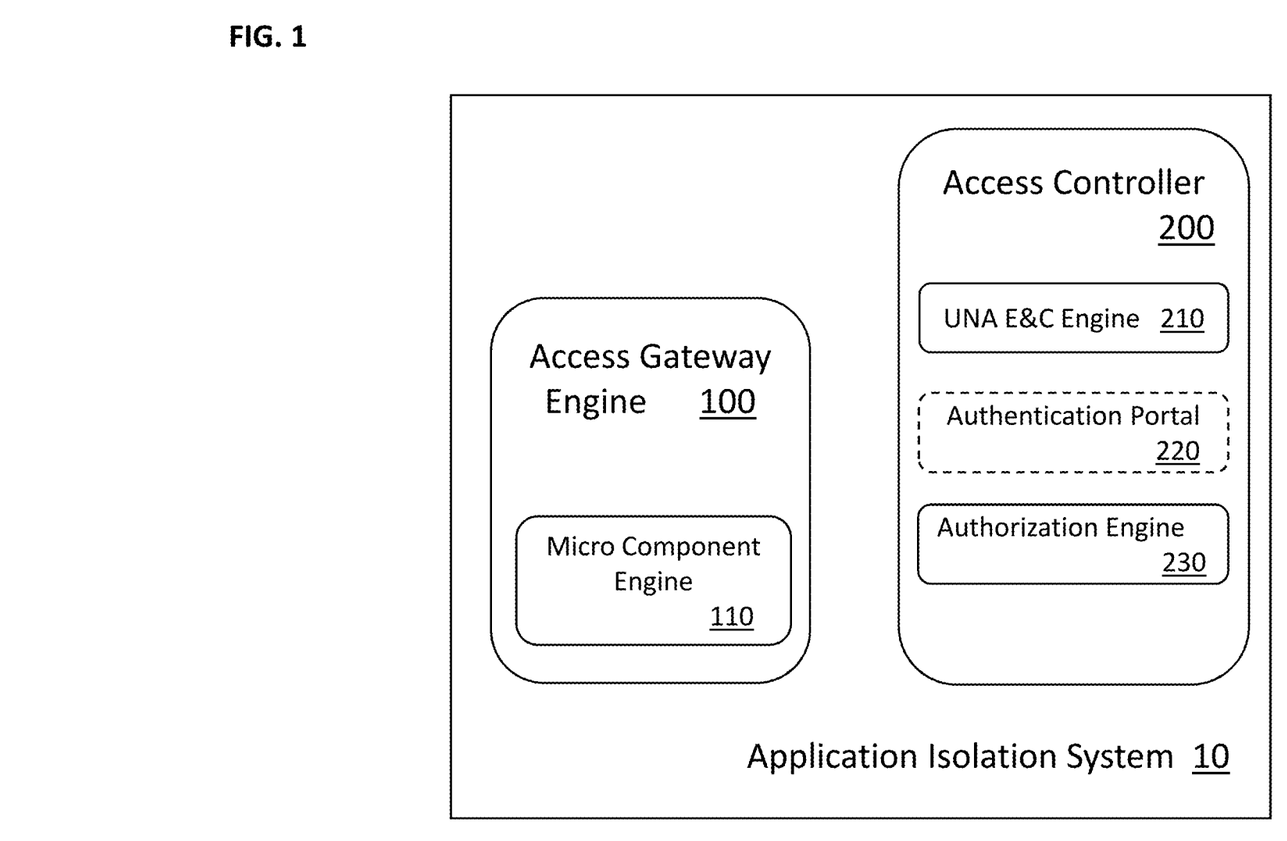
FIG. 1 is a block diagram of the Application Isolation System 10.

Referring now to the drawings, FIG. 1 illustrates a block diagram of the Application Isolation System 10. The Application Isolation System consists of five major components and an unlimited number of micro components that can be layered on top of the platform to provided additional security services. The five major components are not all required for the purpose of the instant innovative system but exist to provide options for the administrator.

The five major components are: (1) Access Gateway Engine (AGE) 100, (2) User to Network Address Extraction & Correlation Engine (UNA E&C engine) 210, (3) Authentication Portal 220, (4) Authorization Engine 230, and (5) Micro Component Engine 110. It is made clear that the chosen names of the components are merely exemplarily and not intended to be limiting in any way. Furthermore, specific components are described below as performing specific tasks. This is not to be viewed as limiting. That is to say that when one component has been described as performing a function, yet it is possible or optional for a different component to perform that same function, then it is to be understood that the description is not intended to necessarily be limiting but merely exemplary. Accordingly, performance of the specified function is not limited to being performed by the specified component.

The Application Isolation System 10 can be seen as including two broad types of components: 'brains' and 'brawn' (muscle). The 'brains' of the system fall under the umbrella component called the Access Controller 200 which includes at least the UNA E&C Engine 210 and the Authorization Engine 230. By default, the Authentication portal 220 is also inside the Access Controller but can actually be located anywhere in the system or on the network.

The 'muscle' of the system is the Access Gateway Engine (AGE) 100 that actually, physically, secures the network from malicious attacks. Preferably, the AGE 100 includes the Micro Component Engine 110 which provides additional security features. Each of the components are described hereafter.

Access Gateway Engine

The Access Gateway Engine (AGE) 100 is an OSI layer 2-7 ethernet switch that can operate within a physical, virtual or containerized network or host machine. The AGE 100 can be deployed inline and transparently between users and applications without any changes to network routing topologies (like an L2 switch) or can be deployed to further isolate network subnets (like an L3 router). The primary purpose of the access gateway engine is, by default, to deny all traffic to applications that sit behind it. Only when instructed by the Authorization Engine 230, does the AGE open up access to a specific application for a specific user.

The access gateway can also perform content inspection functions for the purpose of security and access control. This is achieved by the Access Gateway Engine 100 optionally communicating with the Micro Component Engine 110. For example, the Micro Component Engine 110, has the ability to do deep packet inspection, acting as a "network sensor", to match packets to known bad network behavior, much like a traditional Intrusion Detection and Prevention System (IDS/IPS).

Another example of the Access Gateway Engine's communication with the Micro Component Engine, is its ability to instruct the Micro Component Engine to perform packet metadata extraction for the purpose of Artificial Intelligence (AI) and Machine Learning (ML) to identify anomalous, unknown behavior. The Access Gateway's use of the Micro Component Engine is limitless.

User to Network Address Extraction & Correlation Engine

The User to Network Address Extraction & Correlation (UNA E&C) Engine 210 is a component in the Access Controller 200. The UNA E&C engine 210 identifies the users that have been authenticated on the network, prior to identifying which applications they are authorized to access. The UNA E&C engine can extract this information from any service within the network that authenticates users, such as, but not limited to: (1) Firewall/VPN Devices, (2) Authentication Directory (such as LDAP, Kerberos, Active Directory, Active Directory Federation Services/ADFS), and (3) Isolation System's Authentication Portal.

The way UNA E&C engine 210 extracts the username and its associated address, fixed or temporary, is by communicating with authentication services within the network. Dedicated devices on a LAN have a fixed network address. As such, someone logging onto the network from their regular station will have the same network address every time they log on. However, a roving user, connecting to the network from random stations each time, will have a different network address each time they log on from a different station. A user logging on remotely may have a different network address each time they log on. In at least the latter two cases, and in any case where there is not a direct and permanent correlation between a username and a network address, knowing the IP address does not translate into knowing the username. The UNA E&C engine connects the username to the current IP address assigned to that user, for every session that the user logs onto the network. Innovatively, when suspicious or malicious data traffic is traced back to an IP address, the system now knows, thanks to the UNA EC&C engine, which username is the source of the problematic data traffic.

The UNA E&C Engine 210 can either actively poll for this information or can passively receive the information directly from the native authentication services, depending on the configuration of the network and the capabilities of the components. The engine can perform the polling via service application programming interfaces (APIs). Polling is a less-preferred method due to the fact that polling with lengthy intervals between each query to the authentication service means that a user could potentially wait the duration of the interval before being allowed onto the network. Polling at short intervals means that the system send many queries to the authentication service of the network over a short time, wasting computing and bandwidth resources.

The second option is for the engine to receive authentication log data which is automatically and immediately send from the authentication service when a user logs on. When the engine receives the authentication log data, the engine parses the log to pull out the username, associated address and other relevant information.

Regardless of the manner in which the Engine 210 receives the log data, once received, the username and network address are extracted and submitted to the authorization engine 230. The username is used by the authorization engine to map which applications the specific user is allowed to communicate with. The system also allows the user to log in from multiple devices at the same time and still be allowed to access applications from any device.

Authentication Portal

The Authentication Portal 220 is a web application that allows a user to login directly to the Isolation Platform and is typically used when there is no Authentication Directory within the infrastructure and the user is not connecting via a Firewall/VPN device nor is the user simply on the local area network (LAN). The Authentication Portal 210 can also be applied to users who may be temporary workers and may not be listed in the organization Authentication Directory. Once a user logs into this portal, a lookup occurs to see if a user has been provisioned within the portal. If the user does exist, the username and network address of the user are captured and sent over to the Authorization Engine 230 just like the other methods of capturing user identity. The Authentication Portal 220 may support multi factor authentication and may also be used to add multi factor authentication to environments that have single authentication methods.

Authorization Engine

The Authorization Engine 230, upon receiving information from the User to Network Address Extraction & Correlation Engine 210, identifies (by performing a lookup task) the application(s) the user is permitted to communicate with. Once the engine has found the application(s), it pulls out the application destination information for each application. Application destination information can come in many forms such as, but not limited to, the destination IP address and/or the port number of the application.

The system, usually via the Access Controller 200, then begins to construct an access control policy that includes the source address(es) of the user, as well as the destination address, destination port number and protocol of each of the application(s). An example of the newly constructed access control policy could like the following: SRCIP: SRC: 10.1.2.1-DST: 10.1.2.2-DST PORT: 80-PROTOCOL: TCP or a domain name such as SALESFORCE.com. This policy then gets dynamically added to the access gateway Engine, where enforcement of the policies on the network traffic can now begin to take place.

Another example of a policy could be the same information stated in the policy above, but where the policy also includes other policy controls, such as the amount of bandwidth the user is allowed to consume (a quality-of-service policy) or how much time the user is allowed to stay connected to the application before being required to re-authenticate. Another policy may relate to geolocation (based on the user's public IP), such as disallowing connections to the network from certain countries. Another policy may be related to a time restriction. For example, all or specific user may not be allowed to connect to the network over the weekend. Therefore, a hacker trying to log onto the network on a Saturday or Sunday will not be allowed to access the network application.

The Authorization engine not only can allow users to connect to applications, upon authorization, but can also allow applications to communicate with other applications if authorized.

The Authorization Engine 230 not only waits to receive information when a user logs in, but also when a user logs off. If a log off event is captured, the Authorization Engine will retrace the steps performed when the user logged on in order to gather the same information that was used to build the access control policy in the first place. Now, the system searches for the policy associated with the username and removes that access control policy from the access gateway engine.

Micro Component Engine

The Micro Component Engine 110 is an engine that works in conjunction with the Access Gateway Engine 100 to add on other features to the solution. The MCE passes network traffic to these additional add-on components to perform additional network security-related tasks. Examples of these additional components could be an Intrusion Detection and Prevention System (IDS/IPS), a Gateway Antivirus (AV), Sandboxing, Network Traffic Sensor, Web Proxy, a component that can provide application firewalling and more.

Figure 2:
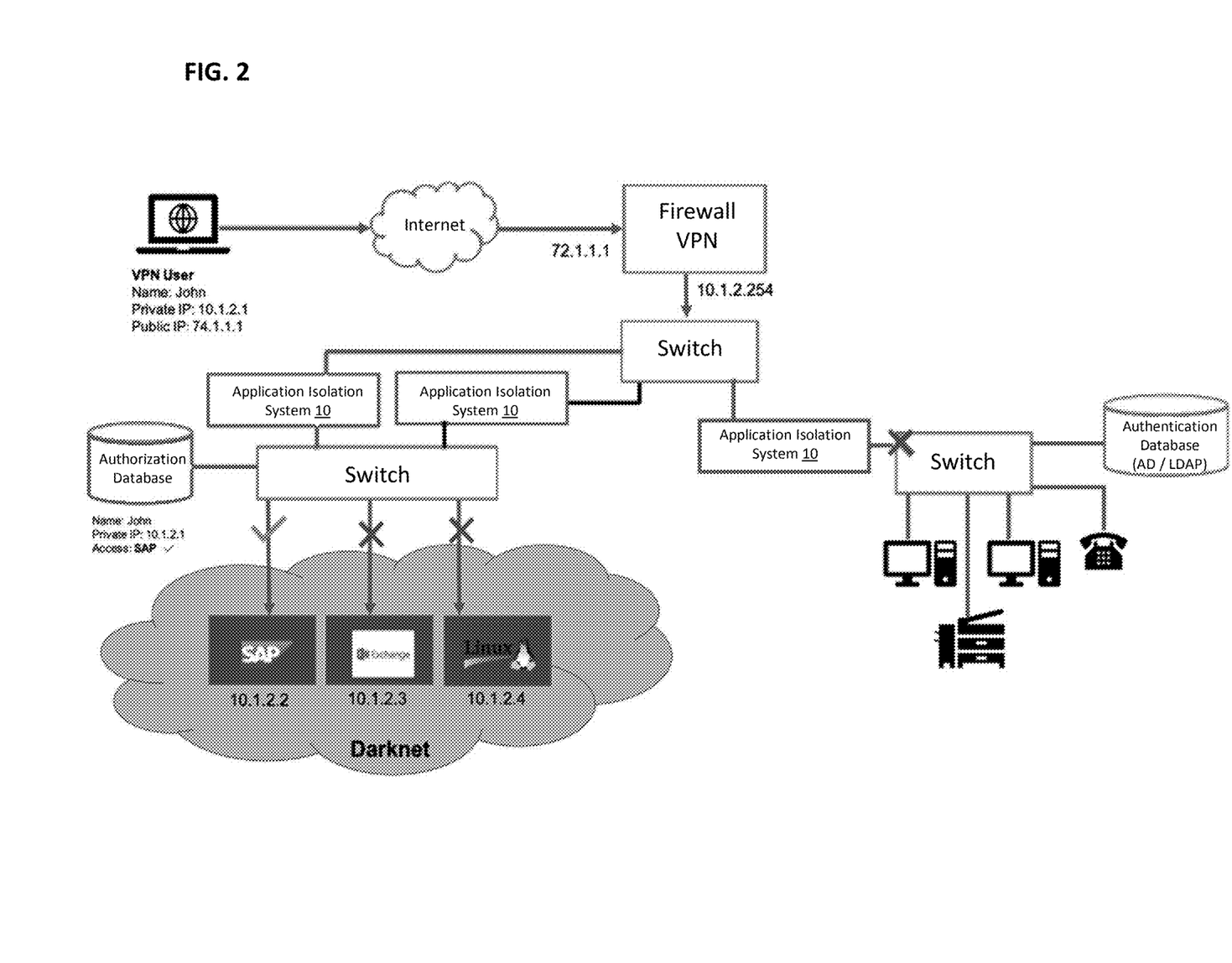
FIG. 2 is a diagram of an exemplary network employing the instant Application Isolation System.

FIG. 2 illustrates a diagram of an exemplary network employing the instant Application Isolation System. Many legacy networks are 'default allow models', where the default of the system is to allow a user access, unless specifically barred from a particular area. The instant system is a 'default deny system', which is also being termed a Zero Trust Network Access (ZTNA) system, where the default is that access is denied to all. Innovatively, the instant network architecture has an isolation layer between the user and the applications. Therefore, a user wishing to access the application server must traverse the isolation layer. When the gateway is closed the network is default deny. Data packets from allowable source to an allowed destination are granted passage through the gateway which is otherwise closed to network traffic.

Exemplarily, a user logs onto the network from a remote location via the Internet. The user authenticates to the VPN/firewall. The Application Isolation System 10 captures the authentication event from the VPN/firewall. In this step, the AIS extracts the username, source IP address, etc. In the next step the AIS looks up the authorization policy in the system database, labeled Authorization Database. The AIS constructs a policy according to the authorization policy from the database. In the next step the AIS installs the policy on the gateway (AGE), so now the previously closed system has a policy according to which it opens the door. Now the user can access the applications, but only the application(s) for which the user is authorized. When the user disconnects from the network, the AIS removes the access control policy (closing the system once again).

On the right-hand side of FIG. 2, the user, John, is not allowed to access the network which may include a printer, a desktop, a voice-over-IP (VOIP) phone, etc. which are all considered applications, in this context.

Legacy ZTNA systems replace the VPN/Firewall block with their own network access block, which would be a ZTNA block. The instant system, by contrast, can be easily employed on an existing network without making changes to the network. The VPN/Firewall is not removed, rather the ZTNA functionality is added. The instant system installs an additional piece of hardware and companion software (and in some cases, firmware) on the existing network. The VPN/Firewall is reconfigured/instructed to forward the log messages to the AIS which then extracts the necessary information as discussed above. In summary, the instant system leverages the telemetry of the existing VPN/Firewall to bring ZTNA controls to the environment.

The applications in the exemplary architecture of FIG. 2 are inside a 'darknet'. The darknet term means that users without access are not even able to see the other applications in the network. The users are not even able to attempt to log on and fail. Users without permission do not see a logon page and have no way of even attempting to log onto those applications, they are completely dark.

Figure 3:
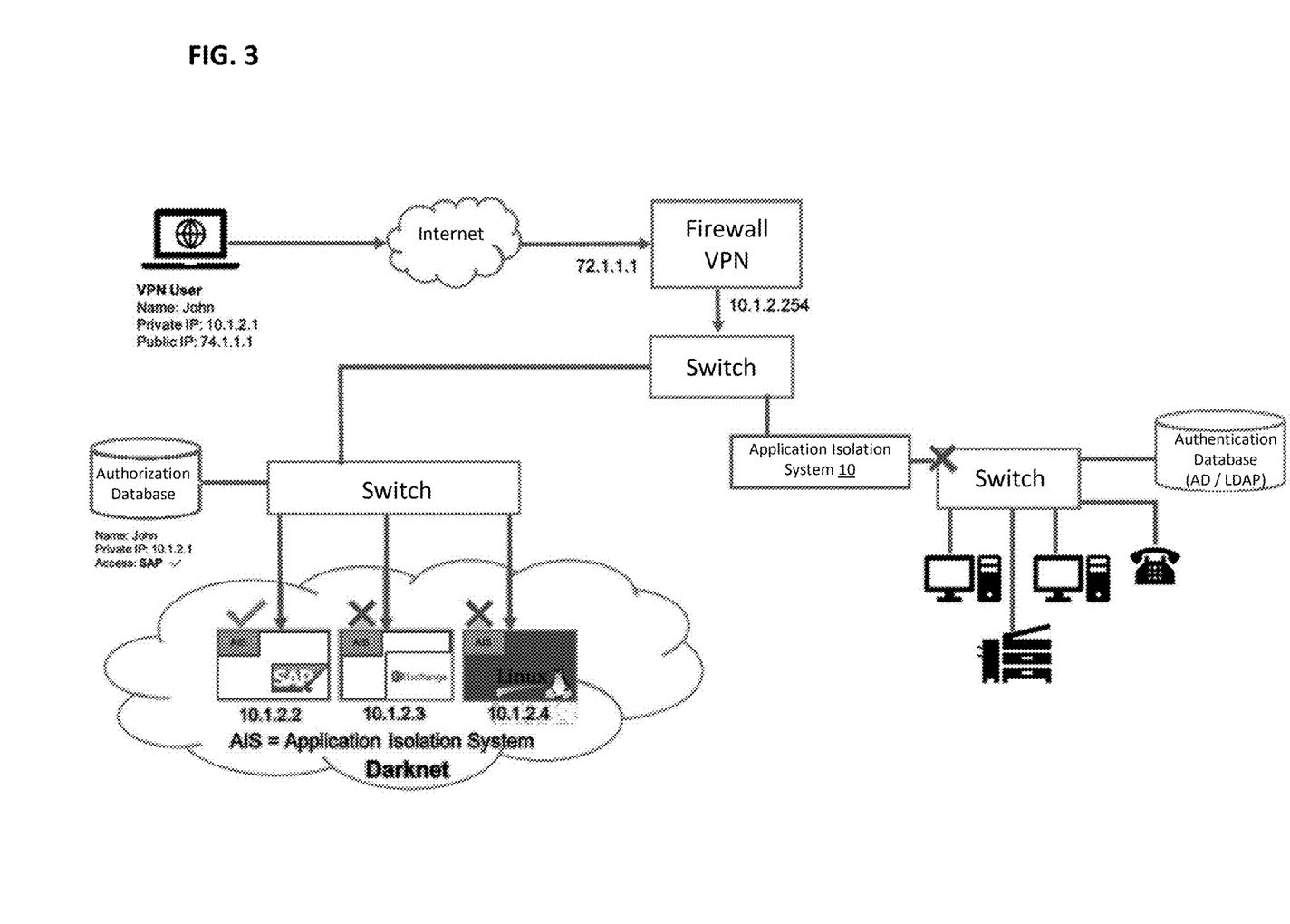
FIG. 3 is a diagram of an exemplary network where the AIS 10 is embodied on a host machine or container network.

Another possible configuration is shown in FIG. 3 which illustrates a diagram of an exemplary network where the AIS 10 is embodied on a host machine or container network. According to the instant configuration, instead of a physical server that acts as a Gateway, the instant system is embodied inside the applications themselves, as software. In FIG. 3, on the right-hand side of the figure, the network devices do not have the option of installing AIS as software, therefore it is necessary to have a physical device inline between the user and the physical devices (printer, telephone, etc.).

Figure 4:
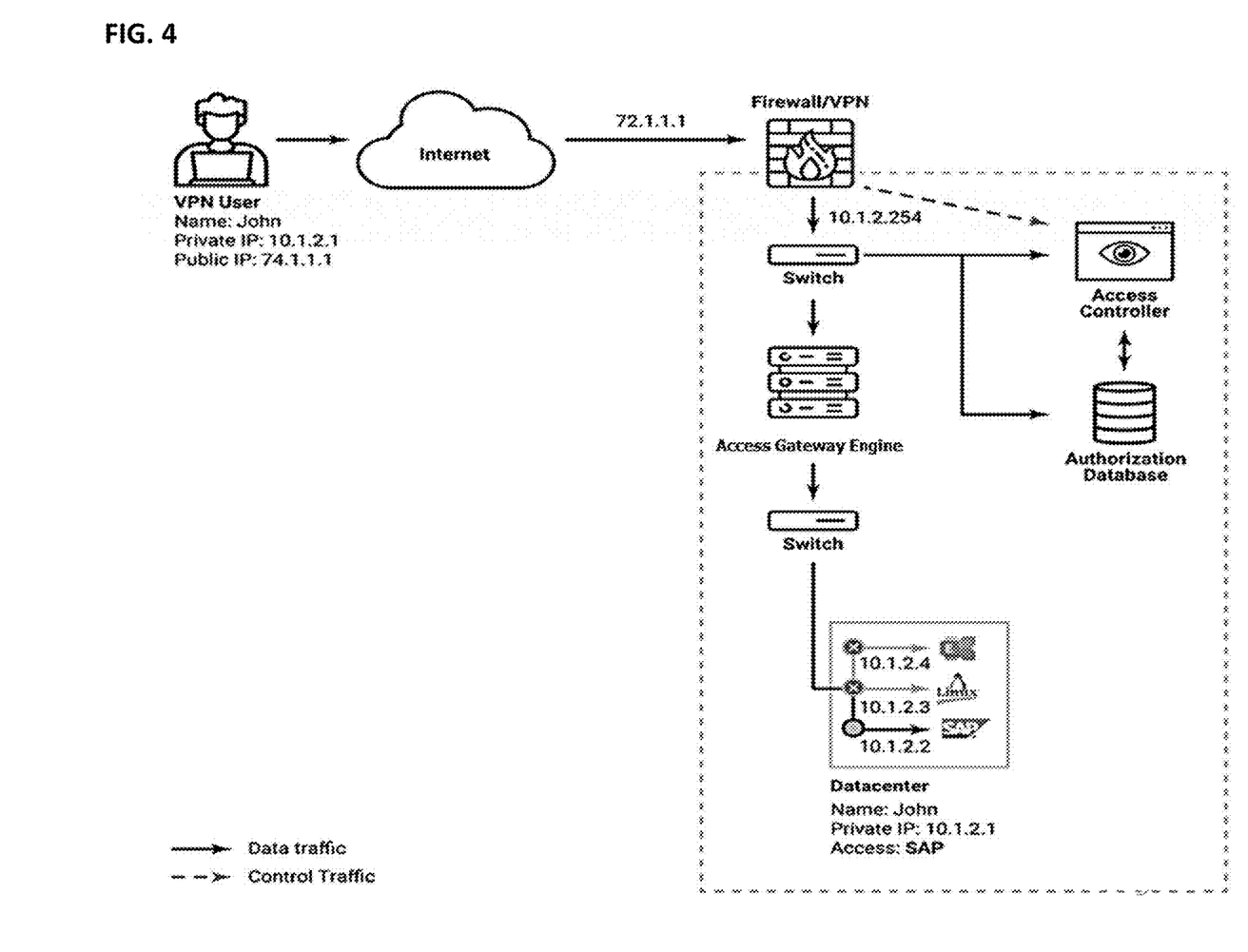
FIG. 4 is a 'North-to-South' access flow.

FIG. 4 illustrates a 'North-to-South' access flow. The instant flow diagram is more detailed that that of FIGS. 2 and 3. According to the flow, the user logs into the network from a remote location through the Firewall/VPN. Inside the network, the user is assigned a private IP address. The Access controller 200 is sent or pulls the logs from the Firewall/VPN from which the Access Controller (e.g., the UNA E&C engine) extracts the user information (username, source IP address etc.). The Authorization Database holds the authorization policy for the user including the list of applications, the destination IP address of the application, the port, the protocol etc. The Access Controller (e.g., the Authorization Engine 230) extracts the authorization policy information from the Authorization Database. The Access Controller generates the access control policy from the gathered data and installs the policy on the AGE. When the user logs off the network, the access control policy is removed.

Figure 5:
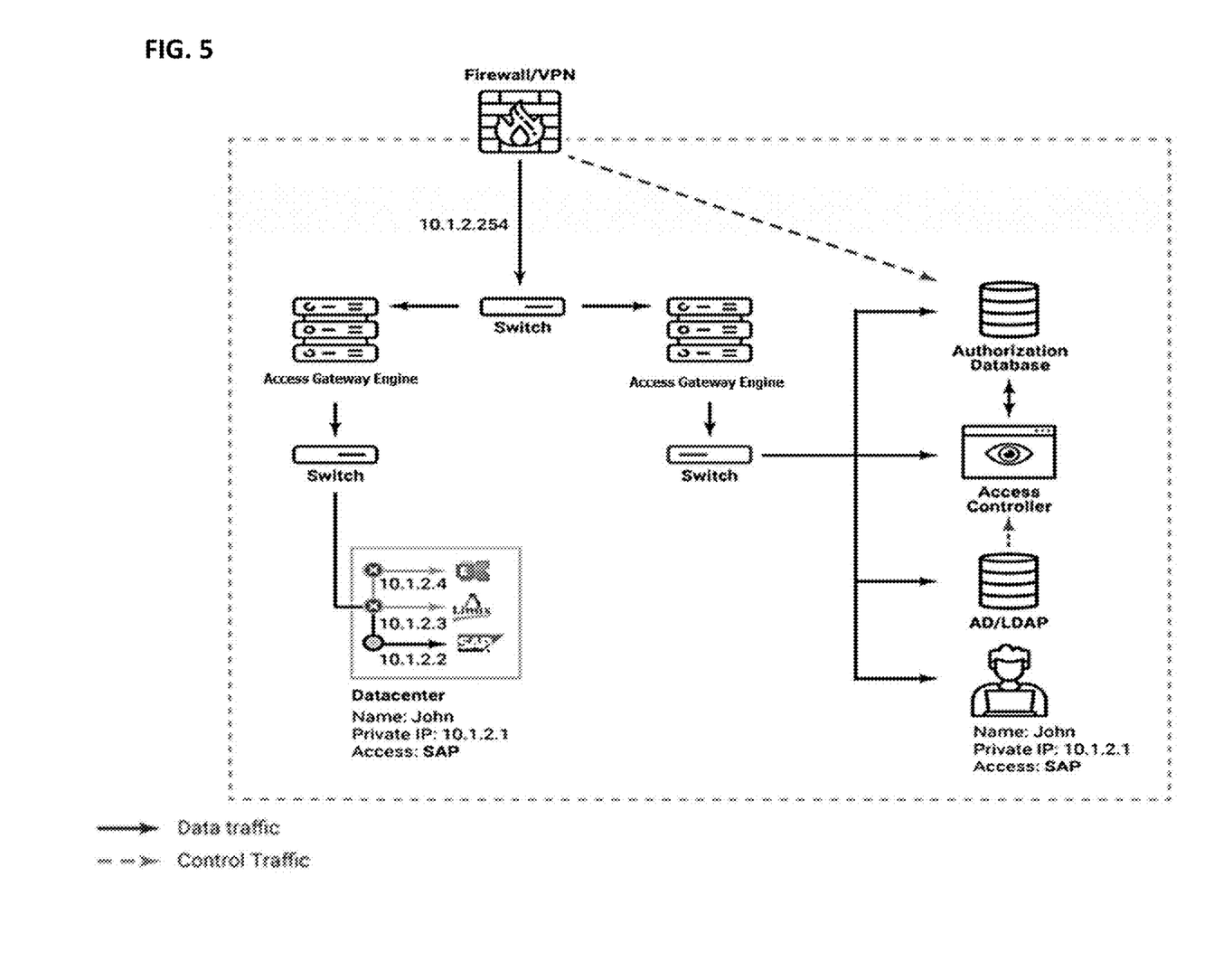
FIG. 5 is an 'East-to West' access flow.

FIG. 5 illustrates an 'East-to West' access flow. According to the flow, the user does not log onto the network remotely but rather from within the Local Area Network (LAN) itself. For example, the user is sitting in his/her cubicle and trying to access the network datacenter. Here the network exemplarily authenticates the logon at the Active Directory® (AD) or LDAP. The Access controller is sent or pulls the logs from the AD/LDAP from which the Access Controller (e.g., the UNA E&C engine) extracts the user information (username, source IP address etc.). The Authorization Database holds the authorization policy for the user including the list of applications, the destination IP address of the application, the port, the protocol etc. The Access Controller (e.g., the Authorization Engine 230) extracts the authorization policy information from the Authorization Database. The Access Controller generates the access control policy from the gathered data and installs the policy on the AGE. When the user logs off the network, the access control policy is removed.

Figure 6:
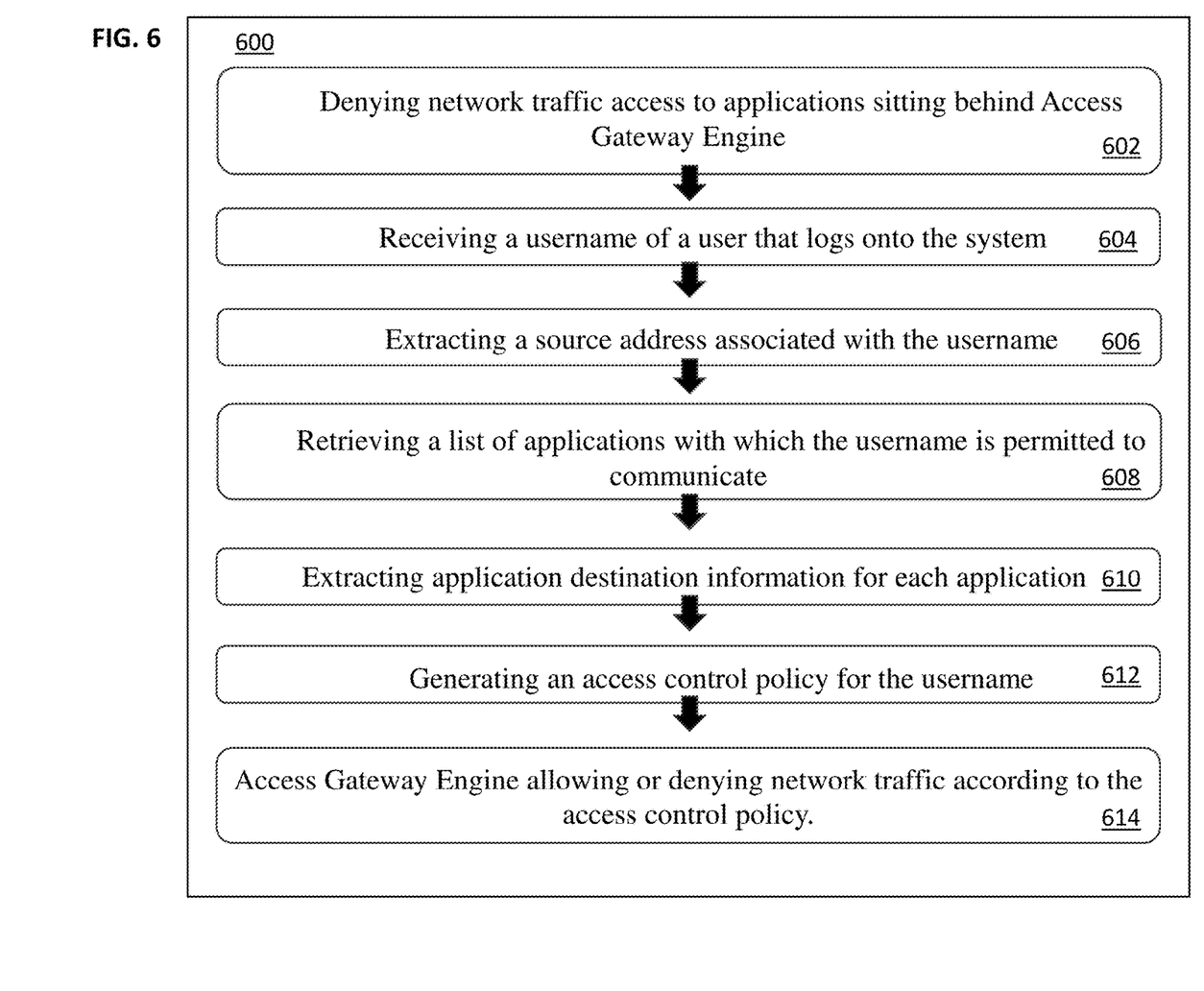
FIG. 6 is a flow diagram detailing the instant process.

FIG. 6 illustrates a flow diagram detailing the instant process. The instant process 600 can be described as a series of steps as follows. The process starts at step 602 where the Application Isolation System employs the Access Gateway Engine to deny network traffic any access to applications that sit behind the AGE 100.

It is noted that the AGE 100 is preferably embodied as a physical device located between the user and the network object that the AIS 10 is protecting. The network object may be an application (e.g., embodied on an application server) or a network device (e.g., a printer or telephone).

When a user logs onto the network using at least a username and password, the AIS 10 receives, at step 604, the username. As mentioned, the UNA E&C engine 210 can either poll the native authentication service or the service can automatically send the username to the engine. At step 606 the UNA E&C engine 210 extracts the source address associated with the username. The user may have a public IP address and a private IP address inside the network. For example, a user working remotely from home will have the public IP address of his home computer, but once he enters the network, he is assigned a private IP address within the internal network. See for example FIG. 2, the User is John, his public IP address is 74.1.1.1 and his private IP address assigned once through the firewall/VPN is 10.1.2.1. In this case, the UNA E&C engine receives the username John and the source address (or in this case, addresses) information which includes the public and private IP addresses. As mentioned elsewhere, the user can log in via the Authentication Portal 220.

At step 608, the Authorization Engine 230, upon receiving the aforementioned information from the User to Network Address Extraction & Correlation Engine 210, identifies the list of at least one application that the user is permitted to communicate with. This information can be extracted from a database that has the list of the user's permissions stored on it (see for example FIG. 2, "Authorization Database"). In FIG. 2, the network includes an exemplary database which stores authorization details for each user permitted on the network. In the example depicted in FIG. 2, the Authorization Database includes an entry with the Username "John", the corresponding private IP address "10.1.2.1" assigned to the username when entering the network and the permissions that the username has, which includes only one permission, namely to the "SAP server".

In step 610, the Authorization Engine 230 extracts the destination address of the application or applications that the user is permitted to communicate with. In the example depicted in FIG. 2, the SAP server is assigned the IP address 10.1.2.2. Now that the Access Controller 200 has all the necessary information, in step 612 the Access Controller 200 generates an access control policy for the user John which is dynamically added to the AGE 100.

In step 614, the AGE begins to enforce the new policy. Data packets coming from the IP address assigned to user/username John will be allowed or denied based on the policy. Therefore, if, for example, John requests access to or use of the SAP server, that network traffic, i.e., those data packets will be allowed to pass through the AGE 100 and reach the SAP server. However, any other data packets with a different destination will be denied at that AGE. It is noted that user John, in the example, is not even able to 'see' the other applications on the network. As such, a malicious user with certain permissions will not be able to see or communicate with other applications on the network for which s/he does not have permissions. Also, a hacker using a stolen or hijacked username will not be able to see, let alone access, any application for which the username does not have a permission for.

Figure 7:
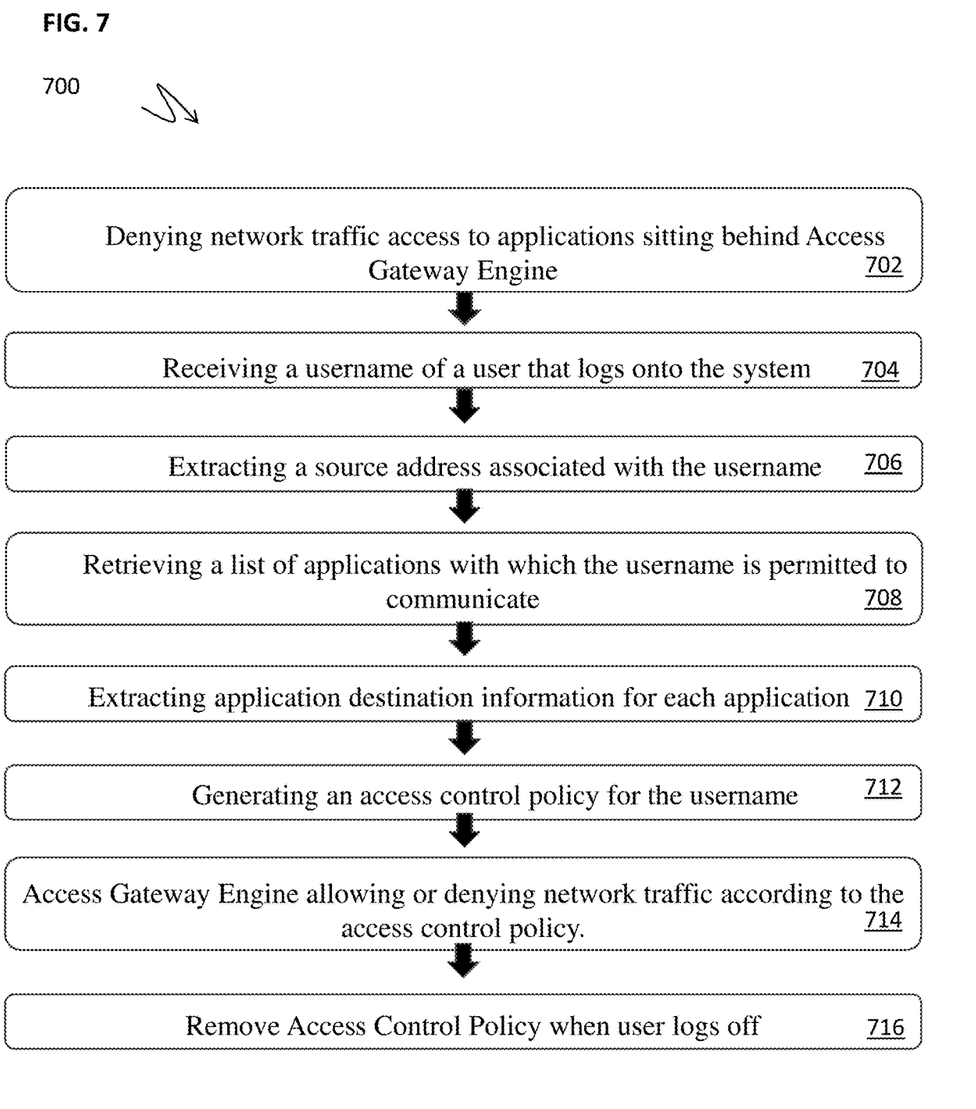
FIG. 7 is a flow diagram of a process 700 that includes access control policy removal when the user logs off.

As an additional security measure, the access control policy is removed from the AGE when the user logs off the system. FIG. 7 is a flow diagram of a process 700 that includes access control policy removal when the user logs off. Process 700 includes all the of the step of process 600, such that steps 702-714 mirror steps 602-614 depicted in FIG. 6 and described heretofore. That description is to be seen as if fully set forth here again to describe steps 702 to 714.

In step 716, the user logs off the network and the AIS 10 removes the access control policy for that user from the AGE 100. In order to remove the policy, it is necessary to recreate the policy, search the AGE for the existing policy that matches the recreated policy and then delete the policy from the AGE 100. It is necessary to remove a policy that is no longer in use because otherwise a new user would inherit the permissions of the policy. To clarify, as detailed above, exemplarily, the policy includes a source IP (of the user/username), a destination IP of the application, a destination port and a protocol. When the current user logs off, the dynamic, private IP address that was assigned to the user will be reassigned. The new user that is assigned the old user's IP address will in essence inherit all of the policies for that IP address. Accordingly, it is important for the system to remove the policy once it is no longer in use.

Figure 8:
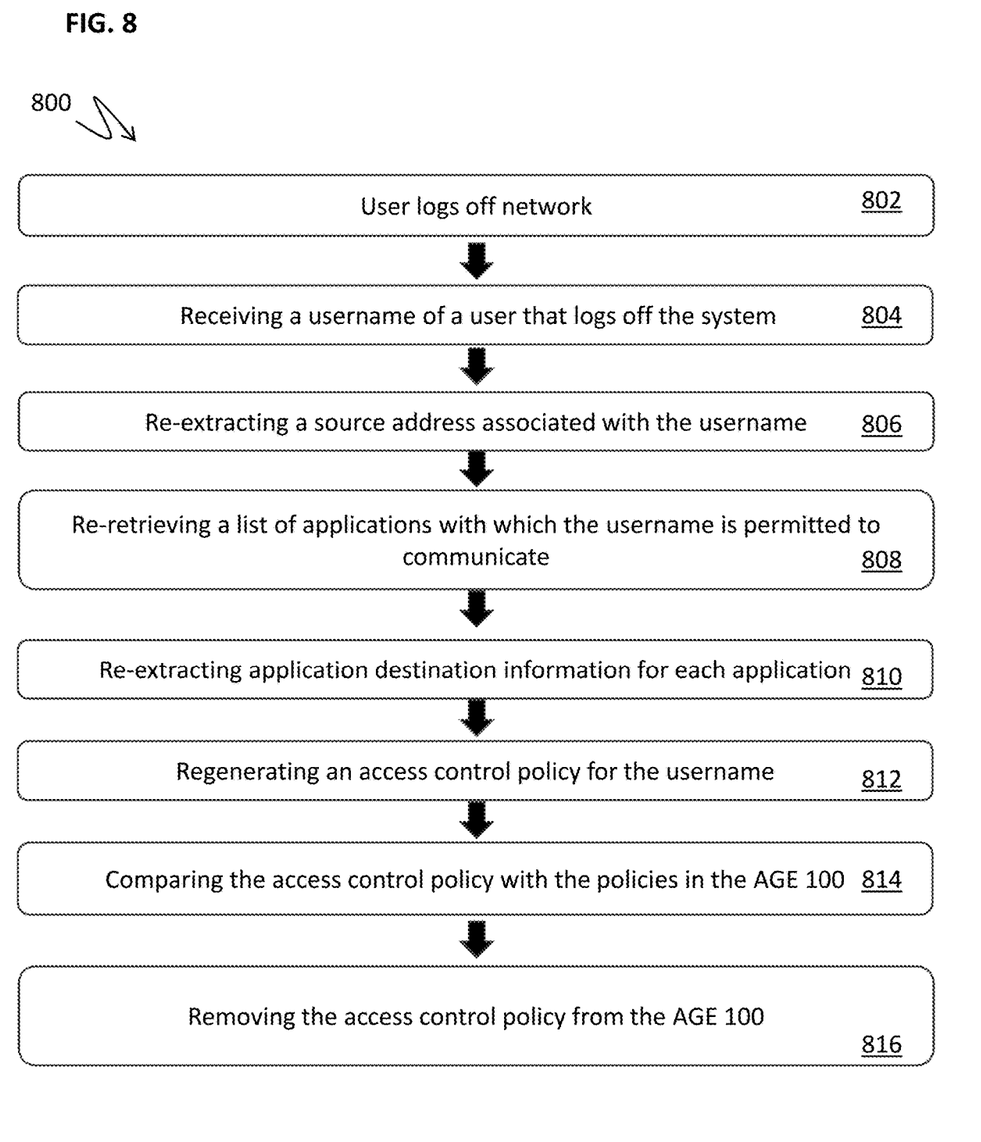
FIG. 8 is a flow diagram of log-off, policy removal sub-process 800.

FIG. 8 illustrates a flow diagram of log-off, policy removal sub-process 800. In step 802, a user logs off the system. The Authorization Engine 230 recreates the policy by retracing the original steps (e.g., steps 604 to 612 of process 600 depicted in FIG. 6) used to create the policy in the first place. In step 804, the UNA E&C engine 210 receives the username of the user that logged off the system. In step 806 engine 210 re-extracts the source address that was associated with the username. In step 808 Authorization Engine 230 re-retrieves the list of applications the username has permissions to communicate with. In step 810 the Authorization Engine 230 re-extracts the destination address of the application or applications that the user is permitted to communicate with. In step 812 the Access Controller 200 regenerates an access control policy for the user.

Once the policy has been recreated, the Access Controller 200, in step 814, searches the AGE for the policy by comparing the regenerated access control policy with the list of policies in the AGE 100. In step 816 the access control policy is removed from the AGE 100.

The processes escribed up to here prevent users or usernames from communicating with applications that they do not have permissions for. However, a hacker or malicious user can gain access to applications for which the hijacked or real user is allowed. Therefore, it is necessary to have additional security features to examine data packets that are permitted to pass through the AGE, in order to ensure that these data packets are not malicious or harmful in any way.

Figure 9:
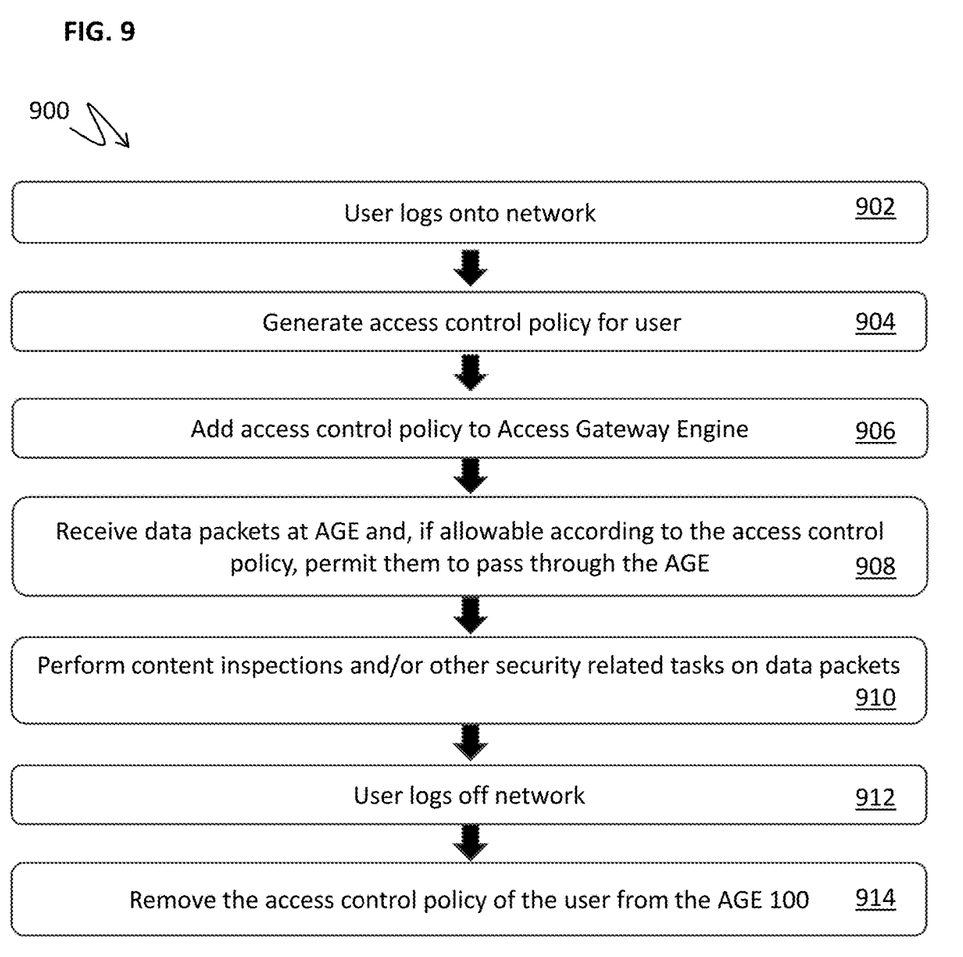
FIG. 9 is a flow chart including security related activities performed on the network traffic.

FIG. 9 illustrates a flow chart including security related activities performed on the network traffic. Process 900 is similar to processes 600 and 700. In step 902, a user logs onto the network. In step 904 at least one access control policy is generated for the user (for example, by employing steps 604 to 612 of process 600). In step 906 the access control policy is dynamically added to the AGE. In step 908, data packets are received at the AGE and are deemed allowable based an existing access control policy in the AGE.

Prior to being forwarded, in step 910, the data packets are inspected for suspicious and/or malicious content and/or behavior. In step 910 one or more security-related tasks are performed on the data packets. A partial list of such tasks is detailed above in relation to the micro component engine 110 which is tasked with inspection of the network traffic and/or effecting other security-related tasks on the network traffic passing through the AGE. In step 912 the user logs off the network and in step 914 the access control policy or policies for that user are removed from the AGE.

While the invention has been described with respect to a limited number of embodiments, it will be appreciated that many variations, modifications and other applications of the invention may be made. Therefore, the claimed invention as recited in the claims that follow is not limited to the embodiments described herein.

Implementation of the method and/or system of embodiments of the invention can involve performing or completing selected tasks manually, automatically, or a combination thereof. Moreover, according to actual instrumentation and equipment of embodiments of the method and/or system of the invention, such as, for example, the AIS, the AGEs, the Access Controller, the UNA E&C engine, the Authorization Engine, as well as several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein, such as the AGEs, are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

What is claimed is:

1. A System configured for installation on an existing network devoid of Zero Trust Network Access (ZTNA) functionality, the system comprising:
    at least one physical gateway comprising a hardware component including at least a processor, memory, and network connectivity, the gateway adapted to be installed on the existing network such that the gateway is interposed between a user host computer accessing the network and a network portion of an application for at least one of a plurality of applications,
    wherein the gateway is configured to deny said user host computer network access to said network portion of the at least one of a plurality of applications unless said user host computer is specifically allowed network access to said network portion by an access control policy, even after said user host computer has gained access to the network; and
    a non-native Access Controller in network communication with a native authentication service and a native authorization database, said Access Controller configured to generate said access control policy based on user authentication logs from said native authentication service and an authorization policy from said native authorization service, such that said gateway provides zero trust network access controls to the network that is not a Zero Trust Network.

2. The system of claim 1, wherein said Access Controller includes:
    a User to Network Address Extraction & Correlation (UNA E&C) Engine configured to extract a username and associated source network address for said host computer; and
    an Authorization Engine configured to extract from said authorization policy, a list of applications and corresponding, respective destination information for each application of said list of applications.

3. The system of claim 2, wherein said UNA E&C engine polls said native authentication service.

4. The system of claim 2, wherein said UNA E&C engine is configured to receive and parse said user authentication logs to extract said username and associated source network address.

5. The system of claim 2, wherein said destination information for each said application, includes at least one of: a network destination address, a destination port and a protocol type.

6. The system of claim 1, further comprising:
    an Authentication Portal adapted to facilitate a user logon from outside the network.

7. The system of claim 1, wherein said gateway includes a micro component engine configured to provide content inspection and additional security-related tasks on data packets allowed by said gateway.

8. The system of claim 1, wherein the system includes two or more gateway engines.

* * * * *